March 10, 1942.　　　J. T. MIDYETTE, JR　　　2,276,058
TEMPERATURE CONTROL SYSTEM
Filed Oct. 24, 1939　　　2 Sheets-Sheet 1

INVENTOR.
John T. Midyette, Jr.
BY Williams, Rich & Morse
ATTORNEYS

March 10, 1942.  J. T. MIDYETTE, JR  2,276,058
TEMPERATURE CONTROL SYSTEM
Filed Oct. 24, 1939  2 Sheets-Sheet 2

INVENTOR.
John T. Midyette, Jr.
BY Williams, Rich & Morse
ATTORNEYS

Patented Mar. 10, 1942

2,276,058

UNITED STATES PATENT OFFICE 2,276,058

TEMPERATURE CONTROL SYSTEM

John T. Midyette, Jr., New Rochelle, N. Y., assignor to Au-Temp-Co Corporation, New York, N. Y., a corporation of New York Application October 24, 1939, Serial No. 300,924

7 Claims. (Cl. 236—91)

This invention relates generally to regulating systems of the type adapted to so function in response to changes in atmospheric conditions as to control the delivery of heat to a building from a heating plant, and is herein illustrated as embodied in a temperature-regulating system which is automatically rendered responsive to variations in outdoor temperature at the beginning of a daytime cycle of operation and is automatically rendered non-responsive to such variations at the beginning of a night-time cycle of operation.

An important object of the present invention is to provide a reliable and effective control system whereby a normal inside or room temperature may be maintained throughout the day-time cycle of operation during which time the control system is maintained responsive to variations in outside temperature.

Another and more specific object of the invention is to provide simple and reliable means which are rendered effective, incident to the beginning of a day-time cycle of operation, for so influencing the operation of the control system generally at the outset of the day-time cycle of operation as to insure raising of the inside or room temperature to a normal value immediately prior to such time as the control system is automatically rendered wholly responsive to variations in outside temperature.

Other objects and advantages of the invention will become apparent when taken in connection with the accompanying drawings, in which—

Figure 1:
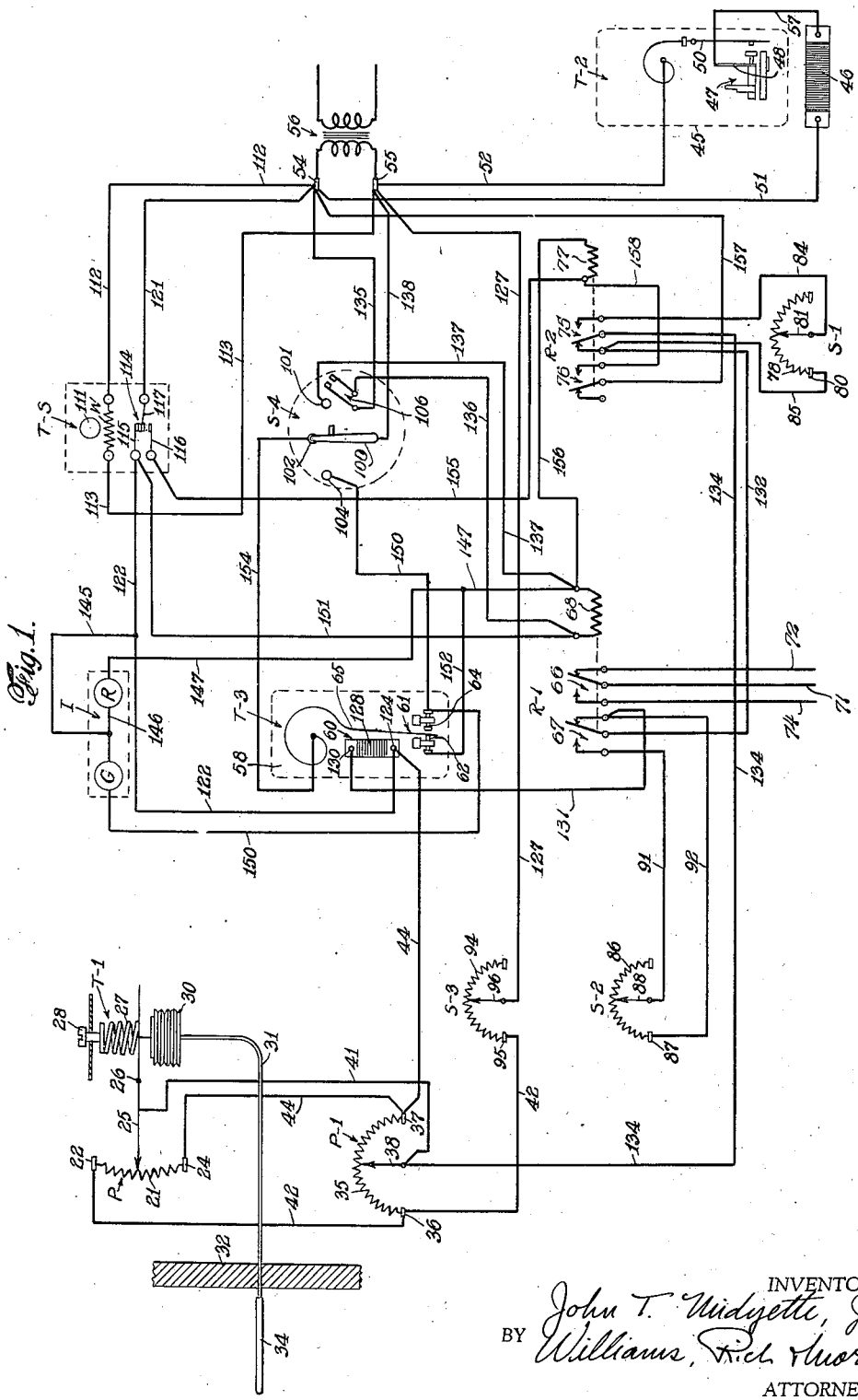
Figure 2:
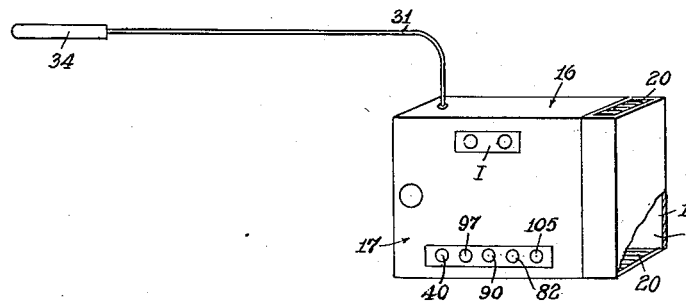
Figure 3:
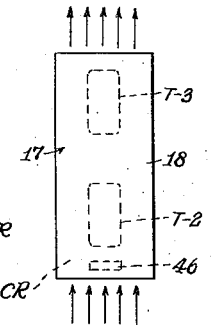
Figure 4:
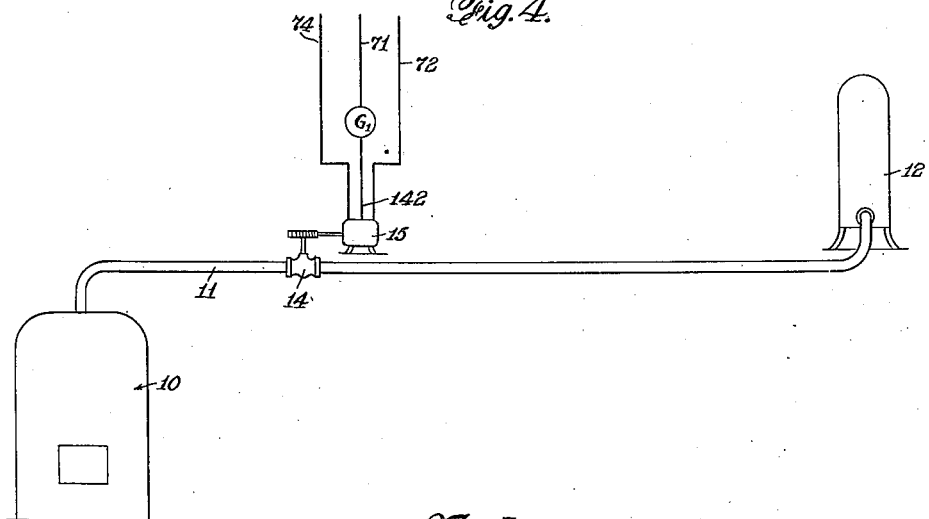
Figure 5:
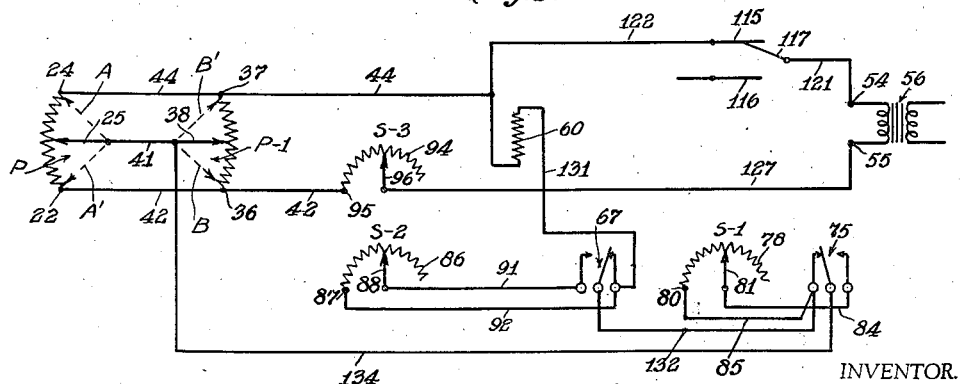

Fig. 1 is a diagrammatic view illustrating various electrical instrumentalities and associated circuits peculiar to the control system; Fig. 2 is a perspective view of a suitable cabinet within which are housed the various instrumentalities of Fig. 1, exclusive of the bulb element of the outside-temperature-responsive thermostat unit; Fig. 3 is an end view of the cabinet of Fig. 2 showing in elevation its flue or flue-like compartment within which are mounted certain of the instrumentalities of Fig. 1; Fig. 4 is a diagrammatic view illustrating a steam-heating plant, the delivery of steam from which is controlled by a valve adapted to be opened and closed by an electrical motor over which control is exercised by the regulating system of Fig. 1, and Fig. 5 is a simplified wiring diagram of a portion of the system diagrammatically illustrated in Fig. 1.

Inasmuch as the present invention may be employed in controlling the delivery of heat to a building from various types of heating plants, as is well understood by those skilled in the art, it is deemed unnecessary to more than schematically illustrate a typical heating plant in order to convey a full and complete understanding of the function and operation of the various instrumentalities and their inter-related electrical circuits which are utilized in attaining the objects sought to be accomplished. To these ends, the heating plant herein shown is illustrated in Fig. 4 as including a steam generator 10, to which is connected a steam-delivery conduit 11, adapted to convey steam to a radiator 12, or any desired number of such radiators, for furnishing heat to a building in accordance with well-known practice, the steam conduit being equipped with a suitable valve 14, adapted to be opened and closed, under conditions hereinafter more particularly described, by an electric motor 15, which is operatively connected to the valve and over which control is exercised by the regulating system illustrated in Fig. 1 as embodying the present invention and as including a thermostat unit T—1, a potentiometer P—1, a pair of thermostat units T—2 and T—3, a pair of relay units R—1 and R—2, a plurality of variable resistance units S—1, S—2 and S—3, a conditioning switch unit S—4, a time controlled switch unit T—S and an indicator unit I.

For the sake of convenience, the regulating system shown in Fig. 1 may be substantially entirely housed within a suitable cabinet 16, which, as shown in Figs. 2 and 3, is provided with a front or control panel 17 and is so constructed as to afford at one end thereof a flue or flue-like compartment 18, the top and bottom walls of which are provided with suitable openings 20 so as to permit an updraft of air through the compartment as and for the purpose hereinafter more particularly described.

The thermostat unit T—1 comprises a resistance element 21, having terminals 22 and 24 and adapted to cooperate with a wiper arm 25 pivotally supported as at 26, the resistance element 21 and wiper arm 25 collectively functioning as a potentiometer P. The wiper arm 25 is cooperatively associated with a compression spring 27 in such a way that it exerts on the wiper arm a thrust in a clockwise direction, the magnitude of which thrust may be varied by means of an adjusting screw 28 which is arranged, as will be readily understood, to effect a desired compression value of the spring at any given position of the wiper arm between its limits of movement. Also associated with the wiper arm 25 is a Sylphon bellows 30 which is gas-tight except for the fact that it communicates with a pressure tube 31, which extends from the inside of a building to be heated to the outside thereof by way of, for example, an outside wall 32 of such building. The pressure tube 31 is provided at its outer end with a so-called bulb 34, which is gas-tight except for the fact that it communicates with the pressure pipe 31. In order that pressure, varying in accordance with outdoor changes in temperature to which the bulb 34 is subjected, may be effectively transmitted to the bellows 30, the closed pressure system, which includes the bellows 30, the pressure pipe 31 and the bulb 34, contains a suitable expansible medium which is of such character, as is well-known to those skilled in the art, that its volume rapidly varies in accordance with variations in temperature to which it is subjected. Since the bellows 30 is so arranged with relation to the wiper arm 25 as to oppose the force of compression exerted thereon by the spring 27, it follows that if and when the bulb 34 is subjected to a rising temperature, the bellows 30 is correspondingly extended under the action of increasing pressure and causes the wiper arm 25 to move in a counter-clockwise direction against the action of the spring 27; whereas if and when the bulb 34 is subjected to a falling temperature, the spring 27 becomes effective, incident to a decrease of pressure within the bellows 30 and a corresponding decrease in the length of such bellows, to move the wiper arm 25 in a clockwise direction.

The potentiometer P—1 includes a resistance element 35 having terminals 36 and 37, and also includes a wiper arm 38 which may be adjusted to various positions on the resistance element 35 by a control knob 40 accessible at the front of the control panel 17 of the cabinet 16. As is evident from Fig. 1, the potentiometers P and P—1 are connected in parallel inasmuch as their respective wiper arms 25 and 38 are connected to each other by a conductor 41 and inasmuch as the corresponding terminals (22, 36—24, 37) of the respective resistance elements 21 and 35 are connected by conductors 42 and 44.

It is to be particularly observed that the thermostat unit T—2 is mounted in a control zone or region CR, which is the lower portion of flue-like compartment 18 of the cabinet 16, in order that it, through means hereinafter more particularly described, may function to there maintain the lower portion of the column of air within the compartment, and hence said control zone or region, at a substantially uniform predetermined or normal temperature. The thermostat unit T—2 is of a suitable snap-acting type with a close-operating differential and includes a support 45 with which are associated an electric heater 46, and an electric switch 47 which comprises a pair of switch elements 48 and 50, the latter of which is of the well-known bi-metallic type and the lower or free end of which is adapted to move to the right, incident to a rise in temperature, and is adapted to move to the left into closed-circuit position with relation to the switch element 48, incident to a drop in temperature, the operation of the thermostat unit being such, because of its close-operating differential, that a slight increase in temperature with respect to a predetermined or normal value of, say, 100° F., will open the switch, whereas a slight decrease in temperature with respect to that value will close the switch. Inasmuch as one end of the electric heater 46 and one end of the switch element 50 are connected respectively by conductors 51 and 52 to the terminals 54 and 55 of a transformer 56, constituting a suitable source of electric current, and since the other end of the electric heater 46 is connected by a conductor 57 to the other switch element 48, it follows that when the switch 47 is closed the electric heater is placed in the circuit of the conductors 51, 52 and 57. When it is taken into account that the electric heater 46 is located in close proximity to the lower or inlet end of the flue-like compartment 18 and that the thermostat unit T—2 has a close-operating differential and serves to control the circuit of the electric heater 46, it becomes apparent that such heater functions to maintain a substantially uniform predetermined or normal temperature of, say 100° F. within the lower portion of the compartment.

Attention is called to the fact that the thermostat unit T—3 is mounted in the upper portion of the flue-like compartment 18 is constantly subjected to heat from the control region CR, due to the fact that the air within that compartment is caused to rise incident to its being heated to a predetermined or normal temperature by the electric heater 46 in the manner described in connection with the operation of the thermostat unit T—2. The thermostat unit T—3 is of the single pole, double-throw, snap-acting type having a relatively wide-operating differential of, for example, 20° F. and includes a support 58, with which are associated an electric heater 60 and an electric switch 61, the latter of which comprises a pair of switch terminals 62 and 64 and a switch element 65, which is of the well-known bi-metallic type and the lower or free end of which is adapted to move to the right and into engagement with the switch terminals 64 incident to a rise in temperature and is adapted to move to the left and into engagement with the switch terminals 62 incident to a drop in temperature. Under certain conditions of operation, hereinafter more particularly described, electric current is passed through the heater 60 so as to influence the ambient temperature of, and hence the operation of, the switch 61; and in order that undue dissipation of heat furnished by heater 60 may be guarded against, the thermostat unit T—3 is equipped with a suitable housing, not shown, through which heat derived from the upward flow of heated air in the flue-like compartment 18 may be transmitted to the thermostat unit and by which heat generated by the electric heater 60 may be retained with sufficient effectiveness to enable the heater to carry out its intended function in the manner hereinafter more particularly described.

The relay unit R—1 includes a pair of single pole, double-throw switches 66 and 67 and an operating coil 68, which, when energized moves the switches 66 and 67 to their positions shown in Figure 1. It will be understood that when the relay coil 68 is energized, the motor 15, which is operatively connected to the valve 14, is placed in circuit with a suitable source of electric current, as shown at $G_1$, and is caused to so operate as to open the valve 14, the motor circuit including, under such conditions, conductors 71 and 72. It will also be understood that when the relay coil 68 is deenergized the motor 15 is placed in circuit (reversing circuit) with the source of electric current, as shown at $G_1$, and is caused to so operate as to close the valve 14, the motor circuit including, under such conditions, conductors 71 and 74.

The relay unit R—2 is substantially a duplicate of the relay unit R—1 in that it includes a pair of single pole, double-throw switches 75 and 76 and an operating coil 77, which, when deenergized, allows the switches 75 and 76 to move to their positions shown in Figure 1.

The variable resistance unit S—1 includes a resistance element 78 having a terminal 80, and also includes a wiper arm 81 which may be adjusted to various positions on the resistance element 78 by a control knob 82 accessible at the front of the control panel 17 of the cabinet 16. For the purpose hereinafter more particularly described, the resistance unit S—1 is, under certain conditions, placed in circuit with the heating coil 60 of the thermostat unit T—3; and to this end the wiper arm 81 of the resistance unit S—1 and the terminal 80 of the resistance element 78 are connected, respectively, by conductors 84 and 85 to the switch 75 of the relay unit R—2.

The resistance unit S—2 is substantially identical with the resistance unit S—1 in that it includes a resistance element 86 having a terminal 87, and also includes a wiper arm 88 which may be adjusted to various positions on the resistance element by a control knob 90 accessible at the front of the control panel 17 of the cabinet 16. For the purpose hereinafter more particularly described, the resistance unit S—2 is, under certain conditions, placed in circuit with the heating coil 60 of the thermostat unit T—3; and to this end the wiper arm 88 of the resistance unit S—2 and the terminal 87 of the resistance element 86 are connected, respectively, by conductors 91 and 92 to the switch 67 of the relay unit R—1.

The resistance unit S—3 is substantially identical with each of the resistance units S—1 and S—2 in that it includes a resistance element 94 having a terminal 95, and also includes a wiper arm 96 which may be adjusted to various positions on the resistance element 94 by a control knob 97 accessible at the front of the control panel 17 of the cabinet 16. As will be readily understood from an inspection of Fig. 5, the resistance unit S—3 is employed to obviate short circuiting the transformer 56 across its terminals 54 and 55 should the wiper arm 25 of potentiometer P and wiper arm 38 of potentiometer P—1 assume potentiometer short-circuiting positions A—B or A'—B'. It will also be understood that the switch unit S—3 may be employed to vary the voltage applied to the terminals 24 and 37 of the resistance elements 21 and 35 of the potentiometers P and P—1.

The conditioning switch unit S—4 may be of any suitable multi-contact type and is herein illustrated as including a switch arm 100, adapted to be moved into circuit-closing position with respect to each of a plurality of contacts 101, 102, 104 by a control knob 105 accessible at the front control panel 17 of the cabinet 16. The conditioning unit S—4 also includes an auxiliary switch 106, adapted to be moved into circuit-closing position by the switch arm 100 as it is moved into circuit-closing position with reference to the contact 101, the switch 106 being adapted to move out of closed-circuit position incident to movement of the switch arm 100 in a couner-clockwise direction from its position of engagement with the contact 101.

The time-control switch unit TS comprises an electric clock 111, the field winding W of which is connected by conductors 112 and 113 to the terminals 54 and 55 of the transformer 56. The switch unit TS also comprises a single-pole double-throw switch 114, which includes a pair of contacts 115 and 116 and a switch arm 117, which switch arm may be so controlled by the clock 111, as will be readily understood by those skilled in the art, that it will move at a predetermined time (a. m.) and at a predetermined time (p. m.) into engagement with the contacts 115 and 116, respectively, so as to condition the control system for operation, respectively, during the day-time and night-time.

The indicator unit I comprises a pair of lamps R and G which are so mounted in the cabinet 16 that they, as shown in Fig. 2, are visible at the front of the panel board 17. As will hereinafter more clearly appear, the lamps R and G respectively function, when the switch arm 100 of switch unit S—4 engages the contact 102, to indicate, during the day-time, when the relay R—1 is energized and deenergized, an additional function of the lamp G being to indicate, during the day-time, a definite off position of the switch unit S—4 as when the switch arm 100 of that switch unit is moved in a counter-clockwise direction out of engagement with the contact 102 and into engagement with the adjacent contact 104.

It will also be observed from Fig. 1, especially when considered in conjunction with the somewhat simplified and fragmental wiring diagram of Fig. 5, that the line circuit, in which the potentiometers P and P—1 are disposed in parallel, may be traced from one terminal 54 to the other terminal 55 of the transformer 56 by way of a conductor 121, the switch arm 117 of the time-control switch 114, the contact 115 of the switch 114, a conductor 122 leading from the contact 115 to one terminal 124 of the heater 60 of thermostat unit T—3, conductor 44 which is connected to the terminals 24 and 37 of the potentiometers P and P—1 and also to the terminal 124 of the heater 60, the potentiometers P and P—1, the conductor 42 which is connected to the terminals 22 and 36 of the potentiometers P and P—1 and also to the terminal 95 of the variable resistance unit S—3, and a conductor 127 leading from the wiper arm 96 of the resistance unit S—3 to the terminal 55 of the transformer 56.

The load circuit, which is under the control of the potentiometers P and P—1 only during daytime operation of the control system, includes (assuming the relays R—1 and R—2 are respectively energized and deenergized) the conductor 44, the terminal 124 of the heater 60 of the thermostat unit T—3, the resistance element 128 of the heater 60, the terminal 130 of the heater 60, conductor 131 leading from the terminal 130 of the heater 60 to switch 67 of the relay R—1, conductor 132 leading from the switch 67 of relay R—1 to the switch 75 of relay R—2, and conductor 134 connected directly to the wiper arm 38 of potentiometer P—1 and indirectly by conductor 41 to the wiper arm 25 of potentiometer P. Under the foregoing assumed conditions of the relays R—1 and R—2, it is obvious that the variable resistance units S—1 and S—2 do not constitute portions of the above-identified load circuit. Under operating conditions which prompt deenergization of the relay R—1, the resistance unit S—2 is connected in the load circuit which then includes the conductor 92 and the conductor 91; and under operating conditions which prompt energization of relay R—2 the resistance unit S—1 is connected in the load circuit which then includes conductor 85 and conductor 84. It is obvious that regardless of whether it is the resistance unit S—1 or the resistance unit S—2 that is rendered effective in the load circuit, the potentiometers P and P—1 both function to control the value of the current supplied to such circuit during day-time operation of the control system. In this connection it is to be particularly noted that the potentiometer P functions to automatically vary such current value and that the potentiometer P—1 functions, in accordance with the manual setting of its wiper arm 38, to predetermine the extent of such current variation.

From an inspection of Fig. 1, it will be observed that when the switch arm 100 of the conditioning switch unit S—4 is moved into engagement with the contact 101 a circuit is completed through the relay coil 68 from one terminal 54 of the transformer 56 to the other terminal 55 thereof by way of a conductor 135 leading from the first-mentioned terminal to the switch 106, a conductor 136 leading from the switch 106 to the relay coil 68, a conductor 137 leading from the relay coil 68 to the terminal 101 of the switch unit S—4, the terminal 101, the switch arm 100, and the conductor 138 leading from the switch S—4 to the terminal 55 of the transformer. Inasmuch as the relay R—1 is energized upon completion of the circuit just described, it follows that the switch unit S—4 may be utilized, at will, to close the circuit of the motor 15, and in turn open the valve 14, which circuit (when the relay R—1 is energized) includes a suitable source of electrical energy, herein illustrated as a generator G₁, the conductor 71 leading from the generator G₁ to the switch 65 of relay R—1, conductor 72 leading from the switch 65 to the motor 15 and conductor 142 leading from that motor to the generator G₁. Incident to closing the circuit of the relay coil 68 by moving the switch arm 100 of the conditioning switch unit S—4 into engagement with the contact 101, a circuit (assuming the time controlled switch 114 is set in accordance with a day-time cycle of operation, in which case the switch arm 117 engages the contact 115) is completed through the lamp R from one terminal 54 of the transformer 56 to the other terminal 55 thereof by way of the conductor 121, the switch arm 117, the contact 115, a conductor 145 leading from the conductor 122 to a conductor 146 connected to both of the lamps R and G, the lamp R, a conductor 147 leading from the lamp R to the relay coil 68, the conductor 137, terminal 101 of the conditioning switch unit S—4, switch arm 100, and conductor 138. Thus, it will be observed that the lamp R is adapted to so function, assuming the time controlled switch 114 to be closed with reference to its contact 115 and its switch arm 117, as to indicate an energized condition of the relay R—1 and an open condition of the valve 14 as effected by moving the switch arm 100 of the conditioning switch unit S—4 into engagement with the contact 101. It will be further understood from an inspection of Fig. 1 that, by moving the switch arm 100 of the conditioning switch unit S—4 into engagement with the contact 104, the relay R—1 may be deenergized, regardless of the condition of the time controlled switch 114, so as to close the reversing circuit of the motor 15 and in turn close the valve 14, which circuit is then completed from one terminal of the generator G₁ to the other terminal thereof by way of the conductor 71, the switch 66 of relay R—1, conductor 74 leading from the switch 66 of relay R—1 to the motor 15, the motor 15, and the conductor 142. Moreover, it will be understood that when the switch arm 100 of the conditioning switch unit S—4 is in engagement with the contact 104, a circuit is completed (assuming the time controlled switch 114 is set in accordance with a day-time cycle of operation, in which case the switch arm 117 engages the contact 115) through the lamp G from one terminal 54 of the transformer 56 to the other terminal 55 thereof by way of the conductor 121, the switch arm 117, the contact 115, the conductor 145, the conductor 146, the lamp G, a conductor 150 leading from the lamp G to the terminal 64 of the thermostat unit T—3 and thence to the contact 104 of the conditioning switch unit S—4, and the conductor 138 leading from the switch S—4 to the terminal 55 of the transformer 56. Thus, it will be observed that the lamp G is adapted to so function, assuming the switch 114 to be closed with reference to its contact 115 and its switch arm 117, as to indicate a deenergized condition of the relay R—1 and a closed condition of the valve 14 as effected incident to moving the switch arm 100 of the conditioning switch unit S—4 into engagement with the contact 104.

Referring again to Fig. 1, it will be noted that when the switch arm 100 of the conditioning switch unit S—4 is moved into engagement with the contact 102, the system in general (assuming the time-controlled switch 114 is set in accordance with a day-time cycle of operation, in which case the switch arm 117 engages the contact 115) is conditioned for automatic operation during the day-time cycle, in which case a circuit, under such operating conditions as cause the switch element 65 of the thermostat unit T—3 to engage the contact 62, is completed through the relay coil 68 from one terminal 54 of the transformer 56 to the other terminal 55 thereof by way of the conductor 121, the switch arm 117, contact 115, a conductor 151 leading from that contact to the relay coil 68, a portion of conductor 147, a conductor 152 leading from the conductor 147 to the terminal 62 of the thermostat unit T—3, terminal 62, switch element 65, a conductor 154 leading from that switch element to contact 102 of conditioning switch unit S—4, switch arm 100, terminal 98, and conductor 138. Inasmuch as the circuit just described as the energizing circuit for the relay coil 68 under the conditions assumed is connected to the circuit of the lamp R at the junction of the conductors 147 and 152, it follows that when the relay coil 68 is energized in the manner just described, a circuit is completed through the lamp R from one terminal 54 of the transformer 56 to the other terminal thereof by way of the conductor 147 and the conductor 152. Thus it will be observed, under the assumed conditions of operation, that the lamp R is adapted to so function as to indicate an energized condition of the relay R—1 and an open condition of the valve 14 as effected by the motor 15 upon the closing of its circuit by way of the switch 66 of relay R—1. Incident to movement of the switch element 65 of the thermostat unit T—3 out of engagement with the terminal 62, the circuit just described as the energizing circuit for the relay coil 68 is opened, whereupon relay R—1 is deenergized with the result that the reversing circuit of the motor 15 is closed by way of the switch 66 of relay R—1, to effect a closed condition of the valve 14. Immediately upon movement of the switch element 65 out of engagement with the terminal 62 and into engagement with terminal 64, the circuit of the lamp R is opened and the circuit of the lamp G is closed, the circuit of the latter-named lamp then including the conductor 150 the terminal 64 of thermostat unit T—3, switch element 65 and conductor 154.

Regardless of what may be the switch setting of the conditioning switch unit S—4, immediately prior to such time as the time controlled switch 114 is so actuated as to condition the control system for a night-time cycle of operation, the circuit of whichever lamp (G—R) may be then energized is opened simultaneously with movement of the switch arm 117 out of engagement with the contact 115 and into engagement with the contact 116 (thus concluding a day-time cycle of operation and initiating a night-time cycle of operation), it being observed in this connection that the circuit of neither of the lamps R and G may be completed unless the switch 114 is in closed-circuit condition with respect to its switch arm 111 and its contact 115. Since the indicator unit I is energized throughout a complete day-time cycle of operation as determined by the time-control switch 114 (the lamp R being energized when the lamp G is deenergized and the lamp G being energized when the lamp R is deenergized) and inasmuch as such one of the these lamps as is illuminated immediately prior to initiating a night-time cycle of operation is extinguished incident to the initiation of such cycle of operation with the possibility of neither being energized so long as the night-time cycle of operation is continued, it follows that the indicator I, when completely deenergized—that is when each of its associated lamps are extinguished—serves to indicate that the control system is then operating on a night-time cycle.

Referring again to relay R—1, it is to be observed that, although it may be energized any time, at will, by moving the switch arm 100 of the conditioning switch unit S—4 into engagement with the contact 101, it can be energized, when the switch arm 100 is in its normal or automatic control position as determined by its engagement with contact 102, only during such time as the system is operating in its day-time cycle as determined by the closed-circuit condition of contacts 115 and 117 of the time-control switch 114. It therefore follows, assuming the switch 100 of the conditioning switch unit S—4 to be in automatic control position, that when the contacts 115 and 117 of the time controlled switch 114 are opened incident to the initiation of a night-time cycle of operation, the relay R—1 is rendered inactive and is maintained inactive throughout the extent of the night-time cycle of operation, thus maintaining during that cycle of operation a closed-circuit condition as between conductors 71 and 74 which are included in the reversing circuit of the motor 15. Inasmuch as the relay R—1 maintains the conductors 71 and 74 in closed-circuit condition throughout the extent of the night-time cycle of operation, it follows that the valve 14, controlling the delivery of steam from the steam generator 10 to the radiator 12 or any desired number of such radiators, is also maintained closed during the night-time cycle of operation. With further reference to the operation of the time controlled switch 114, it is to be observed that when the switch is actuated to effect a night-time cycle of operation of the system the heater element 60 of the thermostat unit T—3 is rendered ineffective, with the result that engagement of the switch element 65 with the contact 62 is insured throughout the duration of the night-time cycle of operation. Assuming engagement of the switch element 65 with the contact 62, whether such engagement exists at the instant the night-time cycle of operation is initiated or is effected incident to cooling of the heater element 60 pursuant to the initiation of such cycle of operation, a circuit is established through the relay coil 77 of relay unit R—2 from one terminal 54 of the transformer 56 to the other terminal thereof by way of the conductor 121, the switch arm 117 of the time-control switch 114, the contact 116 of the switch 114, a conductor 155 leading from the contact 116 to the relay coil 77, a conductor 156 leading from the relay coil 77 to the relay coil 68 of relay R—1, the conductor 147, the conductor 152, contact 62 of the thermostat unit T—3, switch element 65, conductor 154, contact 102 of the conditioning switch unit S—4, switch arm 100, switch terminal 98 and conductor 138 leading from the terminal 98 to the terminal 55 of the transformer 56. Upon energization of the circuit just described as including the relay coil 77, the relay R—2 is energized. Upon energization of the relay R—2, a holding circuit for the relay coil 77 is established by way of a conductor 157 leading from the terminal 54 of the transformer 56 to the switch 76 of the relay R—2, and a conductor 158 leading from the switch 76 to the relay coil 77. The relay coil 77 is maintained energized throughout the extent of the night-time cycle of operation by the energizing circuit which includes the conductor 155 and by the holding circuit which includes the conductor 158. Incident to the completion of the night-time cycle of operation, the energizing circuit which includes the conductor 155 is opened by reason of the fact that the contacts 116 and 117 then assume an open-circuit relation. Despite the fact that the energizing circuit which includes the conductor 155 is opened at the conclusion of a night-time cycle of operation, the relay coil 77 is maintained energized through its holding circuit, which includes the conductor 158, inasmuch as that circuit, which also includes the terminal 62 and the switch element 65 of the thermostat unit T—3, is completed due to the closed-circuit relationship of the contact 62 and switch element 65 of the thermostat unit T—3, which closed-circuit relationship is maintained until such time as sufficient heat is delivered to the switch element 65 by the heater 60 to cause that switch element to move out of engagement with the contact 62, it being noted in connection with the heater 60 that it is placed in circuit simultaneously with the completion of the night-time cycle of operation by reason of the fact that the contacts 115 and 117 of the time controlled switch 114 then assume a closed-circuit relation. During such time, pursuant to the completion of the night-time cycle of operation and the initiation of the day-time cycle of operation, as the relay coil 77 of the relay R—2 is maintained energized under the action of its holding circuit, in which is included the conductor 158, the resistance element 78 of the variable resistance S—1 is maintained in circuit with the heater element 60 of the thermostat unit T—3 by way of the conductor 131, the switch 67 of relay R—1 (which relay cannot be deenergized until after the switch element 65 of the thermostat nut T—3 moves out of closed-circuit relation to the contact 62 and into closed-circuit relation to the contact 64 pursuant to the initiation of a day-time cycle of operation), conductor 132, conductor 85, conductor 84, switch 75 of relay R—2, and conductor 134. At the instant the relay coil 77 of the relay R—2 is deenergized, by reason of its holding circuit (which includes the conductor 158) being opened incident to the switch element 65 of the thermostat unit T—3 moving out of engagement with the contact 62, the switches 75 and 76 of the relay R—2, move to their respective position shown in Fig. 1, after which the relay R—2 can not be energized under any circumstances encountered during the day-time cycle of operation, which means, of course, that during such cycle of operation the resistance element 78 of the variable resistance unit S—1 is maintained out of circuit with the heater 60 of the thermostat unit T—3.

After a day-time cycle of operation has been initiated and after deenergization of the relay coil 77 of relay R—2 has been effected by opening its holding circuit in the manner described, the relay R—1 becomes subjected to energization and deenergization according to variations in outside temperature, as will hereinafter more clearly appear, it being observed that during such time as the relay R—1 is energized, while the system is operating in a day-time cycle, the resistance element 86 of the variable resistance unit S—2 is maintained out of circuit with the heater 60 of the thermostat unit T—3, and that during such time as the relay R—1 is deenergized, while the system is operating in a day-time cycle, the resistance element 86 of the variable resistance unit S—2 is maintained in circuit with the heater element 60 of the thermostat unit T—3.

Although it is believed that the general operation of the control system embodying the present invention may be fully understood by those skilled in the art from the foregoing description, it may be well to point out that the potentiometers P and P—1, which function in conjunction with each other to control the value of the current supplied by way of the load circuit to the heater 60 of the thermostat T—3 during a day-time cycle of operation, are peculiar in that the potentiometer P—1 may be manually set to predetermine the extent of current variation automatically effected by the potentiometer P—1. In this connection, it will be observed, reference being had to Fig. 5, that if the wiper arm 38 of the potentiometer P—1 is positioned, as shown in full lines, on its associated resistance element 35 to limit the current supplied to the heater 60 to, for example, five amperes, the potentiometer P is adapted to then function (incident to movement of its wiper arm 25 from its dotted line position A to its dotted line position A') to automatically vary the current supplied to the heater throughout a range of from zero to five amperes. On the other hand, if the wiper arm 38 of the potentiometer P—1 is positioned as shown at B to limit the current supplied to the heater 60 to, for example, 10 amperes, the potentiometer P is adapted to then function (incident to movement of its wiper arm 25 from its dotted line position A to its dotted line position A') to automatically vary the current supplied to the heater throughout a range from zero to 10 amperes; whereas if the wiper arm 38 of the potentiometer P—1 is positioned as shown at B' no current is capable of being supplied to the heater 60 (inasmuch as the terminals 124 and 130 of that heater are then at the same potential) and hence it is impossible for the potentiometer P to then influence the current value of the load circuit even though its wiper arm 25 may move from its dotted line position A to its dotted line position A'.

From the immediately preceding description of the joint operation of the potentiometers P and P—1, it will be understood (assuming the wiper arm 38 of the potentiometer P—1 to be set in other than its B' position) that as the outside temperature falls and the wiper arm 25 of potentiometer P accordingly moves toward its position A, the amount of current delivered to the heater 60 of the thermostat unit T—3 is diminished; and that as the outside temperature rises and the wiper arm 25 of the potentiometer P accordingly moves toward its position A', the amount of current delivered to the heater 60 is increased. Taking into account the fact that movement of the switch element 65 of the thermostat until T—3 out of circuit-closing relation to the contact 62 is effected as a result of heat supplied to the switch element by the heater 60, it follows that the lower the outside temperature the greater will be the time required for the heater to furnish sufficient heat to cause the switch element to move to open-circuit position and the higher the outside temperature the less will be the time required for the switch element to move to open-circuit position. Since the valve 14, controlling the supply of steam from the steam generator 10, is maintained open while the switch element 65 of the thermostat unit T—3 engages the contact 62 and is closed incident to movement of the switch element 65 into engagement with the contact 64, it follows— due to the influence exerted by the heater 60 on the switch element 65—that when relatively cold outside temperatures are encountered the valve 14 is maintained open during longer periods and closed during shorter periods than when milder outside temperature conditions are encountered.

It is believed the relationship of the potentiometers P and P—1 to the thermostat unit T—3 may be readily appreciated by those skilled in the art from what has already been stated in connection with the manner in which the thermostat unit T—3 depends for its operation on the potentiometers P and P—1, but it may be well to point out, for example, that if a rise in the ambient temperature of the switch 61 from 100° F. (the temperature maintained within the lower portion of the flue-like compartment 18 by the thermostat unit T—2) to 120° F. is required to move the switch element 65 of the thermostat unit T—3 out of engagement with the contact 62 and into engagement with the contact 64 and if the heater 60, when supplied with maximum current from the potentiometers P and P—1, delivers sufficient heat to raise the ambient temperature of the switch 61 from 100° F. to 120° F. in twenty seconds, the time required for the heater 60 to effect a rise in temperature of 20° is increased as the current supplied to the load circuit is diminished under the action of the potentiometers P and P—1. In this connection it is to be observed that when a severely low temperature condition, (for example, an outside temperature of 0° F.) is encountered, no current is permitted to flow through the load circuit in which the heater 60 of the thermostat unit T—3 is included, as will be readily understood when it is taken into account that under the assumed low temperature conditions the potentiometer P (due to the A-position of its wiper arm 25—see Fig. 5) functions to establish the same potential at the terminals 124 and 130 of the heater. Thus it will be seen that so long as severely low outside temperature conditions are encountered, the valve 14, controlling the delivery of steam from the heating plant, is maintained open and cannot be closed until such time as the outside temperature rises sufficiently to render the potentiometer P effective in supplying such current to the heater as is necessary to raise the ambient temperature of the switch 61 from 100° F. to 120° F.

Regarding the function of the variable resistance unit S—2, it is to be borne in mind that the resistance element 86 of this resistance unit is placed in the load circuit during such time as the relay unit R-1 is deenergized. Inasmuch as the heater 60 of the thermostat unit T—3 is rendered effective only during a daytime cycle of operation, it follows that the resistance offered by the resistance element 86 is then additive to the resistance offered by the heater 60 and inasmuch as the resistance offered by the resistance element 86 may be varied by moving its associated wiper arm 88 to one position or another it follows that the resistance unit S—2 may be effectively employed to vary the total resistance of the load circuit and thereby predetermine the time required for the heater 60 to furnish sufficient heat, at any given setting of the potentiometers P and P—1 (exclusive of their respective potentiometer-short-circuiting settings) to raise the ambient temperature of the switch 61 from 100° F. to 120° F.

Concerning the function of the variable resistance unit S—1, it is to be borne in mind that the resistance element 78 of this resistance unit is placed in the load circuit during such time as the relay unit R—2 is energized. Inasmuch as the relay unit R—2 becomes energized at such time as the control system enters its nighttime cycle of operation and is thereafter maintained energized, as previously explained, under the action of its holding circuit until such time (pursuant to the initiation of a daytime cycle of operation) as the switch element 65 of the thermostat unit T—3 moves out of closed-circuit relation to the contact 62, it follows that the resistance offered by the resistance element 78 is, during the morning pick-up period (namely that period of the day-time cycle of operation which immediately follows the conclusion of a nighttime cycle of operation), additive to the resistance offered by the heater 60 of the thermostat unit T—3, it being borne in mind that the resistance element 86 does not constitute a portion of the load circuit during the morning pick-up period inasmuch as the relay unit is then maintained energized in view of the existing closed-circuit relation between the contacts 62 and the switch arm 65 of the thermostat unit T—3. Inasmuch as the resistance offered by its resistance element 78 may be varied by moving its associated wiper arm 81 to one position or another, it follows that the resistance unit S—1 may be effectively employed to vary the total resistance of the load circuit and thereby predetermine the time required by the heater 60 to furnish sufficient heat, at a given setting of the potentiometers P and P—1 (exclusive of their respective potentiometer-short-circuit settings), to raise the ambient temperature of the switch 61 from 100° F. to 120° F. In view of the fact that the variable resistance unit S—1 is adapted to so function as to prolong the time required for the heater 60, during the morning pick-up period, to furnish sufficient heat to raise the ambient temperature of the switch 61 from 100° F. to 120° F. so as to establish an open-circuit condition between the switch arm 65 and contact 62 and a closed-circuit condition between that switch arm and the contact 64, it follows that the valve 14, controlling the delivery of steam from the heating plant, may be maintained in open condition a sufficient length of time to permit the room temperature to rise uninterruptedly under the action of the heating system to a predetermined normal value, which is then maintained constant throughout the remainder of the day-time cycle of operation.

Although only one form of the invention is herein shown and described, it will be understood that various changes may be made without departing from the spirit of the invention or the scope of the following claims.

What is claimed is:

1. In a temperature control system for maintaining within limits the temperature of a space within a building, a source of heat to be delivered to said space, means for controlling the delivery of such heat to said space including a temperature-responsive device, a housing, a temperature-responsive device within said housing, means controlled by the last mentioned temperature-responsive device to maintain the same and the region immediately surrounding the same at a substantially constant temperature irrespective of atmospheric conditions within said space, means including said housing for subjecting the first mentioned temperature-responsive device to the influence of air conducted directly to said first mentioned temperature-responsive device from said constant temperature region, and means operating in accordance with variations in outside atmospheric conditions for delivering heat to said first mentioned temperature-responsive device in a varying and supplemental relation to the heat derived from said region.

2. In a temperature control system for maintaining within limits the temperature of a space within a building, a source of heat to be delivered to said space, and means for controlling the delivery of such heat to said space including a temperature-responsive device, a housing in which said temperature-responsive device is located, a second temperature-responsive device within said housing, means disposed within said housing and controlled by the last-mentioned temperature-responsive device to maintain the same and the region immediately surrounding the same at a substantially constant temperature irrespective of atmospheric conditions within said space, said housing and said temperature responsive devices being so arranged that the first mentioned temperature-responsive device is subjected to the influence of air conducted directly to said first mentioned temperature-responsive device from said constant temperature region, and means operating in accordance with variations in outside atmospheric conditions for delivering heat to said first mentioned temperature-responsive device in a varying and supplemental relation to the heat derived from said region.

3. In a temperature control system for maintaining within limits the temperature of a space within a building, a source of heat to be delivered to said space, means for controlling the delivery of such heat to said space including a temperature-responsive device, a housing, a temperature-responsive device within said housing, means controlled by the last mentioned temperature-responsive device to maintain the same and the region immediately surrounding the same at a substantially constant temperature irrespective of atmospheric conditions within said space, means including said housing for subjecting the first mentioned temperature-responsive device to the influence of air conducted directly to said first mentioned temperature-responsive device from said constant temperature region, an electric heater for delivering heat to the first mentioned temperature-responsive device in a supplemental relation to the heat derived from said region, means for effecting delivery of electric current to said heater, and means for varying said current in accordance with variations in outside atmospheric conditions.

4. In a temperature control system for maintaining within limits the temperature of a space within a building, a source of heat to be delivered to said space, means for controlling the delivery of such heat to said space including a temperature-responsive device, a housing, a temperature-responsive device within said housing, means controlled by the last mentioned temperature-responsive device to maintain the same and the region immediately surrounding the same at a substantially constant temperature irrespective of atmospheric conditions within said space, means including said housing for subjecting the first mentioned temperature-responsive device to the influence of air conducted directly to said first mentioned temperature-responsive device from said constant temperature region, an electric heater for delivering heat to the first mentioned temperature-responsive device in a supplemental relation to the heat derived from said region, means for effecting delivery of electric current to said heater, means for varying said current within limits and in accordance with variations in outside atmospheric conditions, and means for relatively varying said limits.

5. In a temperature control system for maintaining within limits the temperature of a space within a building, a source of heat to be delivered to said space, means for controlling the delivery of such heat to said space including a temperature-responsive device, a housing, a temperature-responsive device within said housing, means controlled by the last mentioned temperature-responsive device to maintain the same and the region immediately surrounding the same at a substantially constant temperature irrespective of atmospheric conditions within said space, means including said housing for subjecting the first mentioned temperature-responsive device to the influence of air conducted directly to said first mentioned temperature-responsive device from said constant temperature region, an electric heater for delivering heat to the first mentioned temperature-responsive device in a supplemental relation to the heat derived from said region, means for effecting delivery of electric current to said heater, a thermostat unit operating in accordance with variations in outside atmospheric conditions, potentiometer means under the control of said thermostat unit for varying said current within limits and in accordance with variations in outside atmospheric conditions, and manually adjustable potentiometer means for relatively varying said limits.

6. In a temperature control system for maintaining within limits the temperature of a space within a building, a source of heat to be delivered to said space, means for controlling the delivery of such heat to said space including a temperature-responsive device, a housing, a temperature-responsive device within said housing, means controlled by the last mentioned temperature-responsive device to maintain the same and the region immediately surrounding the same at a substantially constant temperature irrespective of atmospheric conditions within said space, means including said housing for subjecting the first mentioned temperature-responsive device to the influence of air conducted directly to said first mentioned temperature-responsive device from said constant temperature region, an electric heater including a resistance element for delivering heat to the first mentioned temperature-responsive device in a supplemental relation to the heat derived from said region, means for effecting delivery of electric current to said resistance element and including a load circuit of which said resistance element constitutes a portion, adjustable means for varying the resistance of said load circuit, means for varying said current within limits and in accordance with variations in outside atmospheric conditions, and means for relatively varying said limits.

7. In a temperature control system for maintaining within limits the temperature of a space within a building, a source of heat to be delivered to said space, and means for controlling the delivery of such heat to said space including a temperature-responsive device, a housing in which said temperature-responsive device is located, a second temperature-responsive device within said housing, means disposed within said housing and controlled by the last mentioned temperature-responsive device to maintain the same and the region immediately surrounding the same at a substantially constant temperature irrespective of atmospheric conditions within said space, said housing and said temperature responsive devices being so arranged that the first mentioned temperature-responsive device is subjected to the influence of air conducted directly to said first mentioned temperature-responsive device from said constant temperature region, an electric heater for delivering heat to the first mentioned temperature-responsive device in a supplemental relation to the heat derived from said region, means for effecting delivery of electric current to said heater, means for varying said current within limits and in accordance with variations in outside atmospheric conditions, and means for relatively varying said limits.

JOHN T. MIDYETTE, Jr.